(12) United States Patent
Karl (10) Patent No.: US 12,407,742 B2
(45) Date of Patent: Sep. 2, 2025

(54) PROCESSING AND TRANSMITTING VIDEO DATA

(71) Applicant: Siemens Healthineers AG, Forchheim (DE)

(72) Inventor: Harald Karl, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 117 days.

(21) Appl. No.: 18/051,210

(22) Filed: Oct. 31, 2022

(65) Prior Publication Data

US 2023/0135759 A1    May 4, 2023

(30) Foreign Application Priority Data

Nov. 2, 2021   (EP) ..................................... 21206029

(51) Int. Cl.
*H04L 65/611* (2022.01)
*H04L 49/351* (2022.01)
*H04L 65/65* (2022.01)
*H04N 21/44* (2011.01)

(52) U.S. Cl.
CPC .......... *H04L 65/611* (2022.05); *H04L 49/351* (2013.01); *H04L 65/65* (2022.05); *H04N 21/44004* (2013.01)

(58) Field of Classification Search
CPC ......... H04N 21/8456; H04N 21/23424; H04N 21/2665; H04N 21/44004; H04N 21/23412; H04L 65/611; H04L 49/351; H04L 65/65

USPC ......................................................... 386/353
See application file for complete search history.

(56) References Cited

U.S. PATENT DOCUMENTS

| 11,120,677 | B2 | 9/2021 | Lasko |
| 2010/0296571 | A1 | 11/2010 | El-Saban et al. |
| 2013/0147900 | A1 | 6/2013 | Diouskine et al. |
| 2013/0181884 | A1* | 7/2013 | Perkins ................. G06F 3/1423 345/1.3 |
| 2014/0002361 | A1* | 1/2014 | Ballard .................... G09G 5/12 345/163 |
| 2015/0020088 | A1* | 1/2015 | Velasco ............... H04L 12/2838 725/116 |
| 2020/0105410 | A1 | 4/2020 | Hoecht et al. |
| 2022/0329883 | A1 | 10/2022 | Stokking |
| 2023/0104594 | A1 | 4/2023 | Karl |

FOREIGN PATENT DOCUMENTS

WO    WO 2021043706 A1    3/2021

* cited by examiner

*Primary Examiner* — Thai Q Tran
*Assistant Examiner* — Nienru Yang
(74) *Attorney, Agent, or Firm* — Harness, Dickey & Pierce, P.L.C.

(57) ABSTRACT

One or more example embodiments relates to an integrated switching arrangement, in particular an FPGA or ASIC, for processing and transmitting data comprising at least video data in a network. Routes for individual data streams are specified via a configurable addressing scheme. One or more example embodiments further relates to a network device, a network and a method for processing and transmitting data.

15 Claims, 5 Drawing Sheets

FIG 2

PROCESSING AND TRANSMITTING VIDEO DATA

CROSS-REFERENCE TO RELATED APPLICATION(S)

The present application claims priority under 35 U.S.C. § 119 to European Patent Application No. EP 21206029.7, filed Nov. 2, 2021, the entire contents of which are incorporated herein by reference.

FIELD

One or more example embodiments of the present invention relates to an integrated switching arrangement, a network device and a network, as well as to a method for processing and transmitting data comprising at least video data.

BACKGROUND ART

In video technology, the following steps are typically performed as a minimum in order to transmit video signals. First, the video signals are read in from a source, for example a camera or another recording device ("Capture"). Next, in a further step, the video signals are output to a sink, e.g. a monitor, a display or a data storage device. Oftentimes in practice, however, not only point-to-point connections, in which one source is connected to one sink, are desirable, but in many application scenarios it is also necessary for video signals from one or more sources to be distributed to a plurality of sinks ("Distribute"). Between being read in and being output, said video signals are in practice frequently also processed in addition ("Compose"), in other words e.g. increased or reduced in size, cropped, converted into a different frame rate, merged or the like.

In the prior art, the aforementioned steps are performed via independent or separate and specialized devices. In other words, one or more devices form interfaces to the video sources. One or more devices form interfaces to the video sinks. At least one router is arranged as a further device between the video sources and the video sinks and, if necessary, further devices still are arranged as processing units between the sources and the sinks. All these devices must cooperate in order to transport and, if required, process the video signals.

SUMMARY

Between the individual devices, in particular between a source and a sink, it is often desirable to be able also to bridge greater distances, which means that the original interfaces (e.g. DP, HDMI) are not sufficient since generally these have only a limited range of three to five meters. Owing to the ever-increasing demands made on image resolution (HD, 4K), it is proving difficult to transmit these video signals uncompressed and with low latency over standard networks such as Ethernet, for example. Even the SDVOE standard, which is well-known from practice and uses 10G Ethernet, must already perform a compression at a resolution of 4K, 4:4:4 and 60 fps.

One ore more example embodiments support and/or simplify the transmission of uncompressed video signals in a network with low latency.

According to one or more example embodiments, an integrated switching arrangement for processing and transmitting data comprising at least video data in a network includes a number of video interfaces configured to at least one of receive or send the video data in data streams; a number of network interfaces configured to connect the integrated switching arrangement to a number of other spatially separated integrated switching arrangements, the other spatially separated integrated switching arrangements configured to transmit at least the video data; a frame buffer controller and a frame buffer interface, the frame buffer controller configured to control access to a frame buffer, via the frame buffer interface such that the video data from one or more of the other spatially separated integrated switching arrangements can be at least one of stored in the frame buffer as a combined frame of the video data from one or more of the other spatially separated integrated switching arrangements or read out from the frame buffer; and a connection matrix configured to receive and transmit the data streams between the number of video interfaces, the number of network interfaces, and the frame buffer interface, wherein routes of the data streams are specified via a configurable addressing scheme.

According to one or more example embodiments, the switching arrangement further includes a number of video processing units configured to process the video data.

According to one or more example embodiments, the video processing units are configured to process the video data, the processing including at least one of scaling, clipping, filtering, line reconstruction, compression and/or decompression.

According to one or more example embodiments, a data rate of the network interfaces is greater than or equal to 5 Gbps.

According to one or more example embodiments, the video data comprises at least high-resolution video data.

According to one or more example embodiments, the frame buffer controller is configured to position at least one of the data streams of video data in the frame buffer such that the arrangement of the video data of the respective data streams is defined in a frame.

According to one or more example embodiments, the switching arrangement includes at least one of a mouse pointer control unit configured to provide an image of a mouse pointer and assign the mouse pointer to defined positions in the frame buffer, or a window control unit configured to reset the positions if there is a shift in a position of one of the data streams of video data in the frame buffer.

According to one or more example embodiments, the switching arrangement includes an Ethernet interface configured to at least one of receive or send Ethernet data; and an Ethernet control unit configured to send the Ethernet data in accordance with the addressing scheme.

According to one or more example embodiments, the addressing scheme comprises an internal component address via which a route for exchanging the data streams via the connection matrix is specified.

According to one or more example embodiments, a network device includes an integrated switching arrangement and physical interfaces which are connected to the corresponding interfaces of the integrated switching arrangement.

According to one or more example embodiments, the network device includes a processor connected to the integrated switching arrangement via an Ethernet switch, the processor configured to configure the addressing scheme or image processing parameters via a User Datagram Protocol (UDP) unit of the integrated switching arrangement.

According to one or more example embodiments, a network comprises at least one network device, the at least one network device being a network device according to one or more example embodiments.

According to one or more example embodiments, a method for processing and transmitting data comprising at least video data in a network, said method including at least one of receiving or sending video data in data streams; connecting the integrated switching arrangement of claim 1 to the other spatially separated integrated switching arrangements in the network; at least one of storing or reading out the video data from one or more of the data streams as the combined frame of video data in the frame buffer; and exchanging the data streams between the number of video interfaces, the number of network interfaces, and the frame buffer interface.

According to one or more example embodiments, a non-transitory computer program product comprises a computer program which can be loaded directly into an integrated switching arrangement, the computer program having program sections to perform a method according to one or more example embodiments when the integrated switching arrangement is configured via the computer program.

According to one or more example embodiments, a non-transitory computer-readable medium stores instructions that, when executed by an integrated switching arrangement, cause the integrated switching arrangement to perform a method according to one or more example embodiments.

BRIEF DESCRIPTION OF THE DRAWINGS

Example embodiments of the present invention are explained once again below in more detail with reference to the attached figures and with the aid of exemplary embodiments. Like components are labeled with the same reference numbers in the different figures.

The figures are generally not to scale. In the figures.

DETAILED DESCRIPTION

The integrated switching arrangement cited in the introduction is implemented in particular as an integrated circuit, e.g. in the form of an FPGA or ASIC, and serves for processing and transmitting data comprising at least video data in a network. The integrated switching arrangement is embodied in this case in particular in such a way that, if desired, the data can be transmitted uncompressed. For this purpose, it has a number of video interfaces for receiving and/or sending the video data in data streams. It additionally comprises a number of network interfaces for connecting the integrated switching arrangement to a number of substantially identical, spatially separated, integrated switching arrangements for transmitting data comprising at least video data. The integrated switching arrangement further comprises a frame buffer controller and a frame buffer interface.

The frame buffer controller in this case controls accesses to a frame buffer via the frame buffer interface in such a way that video data from one or more data streams can be stored in the frame buffer as a combined frame of video data and/or be read out from the frame buffer. The data can be exchanged between the aforementioned components via a connection matrix of the integrated switching arrangement. At the same time, routes for individual data streams are specified via a configurable address scheme.

An implementation of the integrated switching arrangement as an FPGA is particularly flexible since the FPGA can subsequently be configured according to the application case. An implementation of the integrated switching arrangement as an ASIC can be produced at an affordable cost, in particular in high volumes.

The video interfaces can basically be any video interfaces, for example digital interfaces, such as e.g. DP, DVI, HDMI, SDI or the like, or analog interfaces, such as e.g. VGA, XGA, S-Video or the like. They are preferably embodied for receiving or sending the video signal in uncompressed form. The number of video interfaces can be configured as required. In other words, depending on the application case, the integrated switching arrangement may comprise e.g. only video interfaces for receiving video signals or only video interfaces for sending video signals or an arbitrary combination of said video interfaces. However, at least one of these video interfaces is included in the integrated switching arrangement. Preferably, however, the integrated switching arrangement has both a number of video interfaces for receiving and a number of video interfaces for sending video signals. The general meaning of the term "number" within the scope of this description is "one or more".

The video data is typically present in the form of data streams (also called video streams) in which an image sequence of the video data is transmitted serially one image at a time and one pixel at a time.

The integrated switching arrangement or the network device in which it is contained is connected to further, in particular inventive, integrated switching arrangements via the network interfaces. Stating that these switching arrangements are "substantially identical" means that they may differ with regard to the number and/or embodiment of their video interfaces, network interfaces and/or video processing units, but otherwise they are of a similar design type.

The frame buffer controller controls accesses to a frame buffer via the frame buffer interface in such a way that video data from one or more data streams can be stored as a combined frame of video data in the frame buffer and/or be read out from the frame buffer.

In other words, the frame buffer controller and the frame buffer interface therefore enable different incoming video signals to be combined into a common video signal. The frame is therefore a single image which is stored in the frame buffer—in particular at the frame rate on which the transmission is based—and is read out from it. A sequence of the individual combined frames accordingly forms the combined video signal. Via the frame buffer controller and the frame buffer interface, which cooperate with the frame buffer, individual video signals can therefore be combined, particularly preferably according to the specifications of a user, to form a new, composite video signal ("Compose").

The connection matrix is configured or dimensioned, in particular as a multi-layer matrix, such that it can forward the data of the components connected to it independently of one another and in parallel, in particular on the basis of a component address, to the respective destination component. For this purpose, it can be embodied similarly to an AXI bus, for example.

The integrated switching arrangement is preferably deployed in a static network, i.e. typically, no network devices are added and/or removed during operation, said network having a known topology that remains unchanged during operation. Accordingly, the—preferably optimal—routes between the individual network devices and their respective components are known such that the addressing scheme can be produced during the configuration or installation of the network. The addressing scheme can subsequently continue to be configured during operation in such a way that individual image processing processes or video processing units can be attached in addition or detached. Via the configuration of the addressing scheme it is furthermore possible to choose from which source the video signal is transmitted to which sink(s) and at the same time which route it takes through further network devices and their components where necessary. However, the topology of the network can in principle be changed also by adding and/or removing network devices as necessary; in that case, however, a new configuration of the network, in particular of the addressing scheme, is required.

The network device cited in the introduction has an integrated switching arrangement according to the invention and physical interfaces which are connected to the corresponding interfaces of the integrated switching arrangement. Depending on interface, the network device can therefore be connected to video sources, video sinks, further network devices and also, preferably using further suitable interfaces, to additional devices such as e.g. USB devices, computer units or PCs or the like.

Basically, the video sources can be any devices that output video signals. They can comprise, for example, cameras, medical imaging modalities such as e.g. X-ray devices, computed tomography systems, magnetic resonance tomography systems, ultrasound devices or the like, video signals generated by software and/or measuring equipment, such as e.g. ECG, EEG or the like, video signals retrieved from data storage devices or the like. Basically, any devices that output video signals serve as video sinks. They can comprise, for example, monitors, displays or other display devices, data storage devices, a connection to an external network or the like. The USB devices can comprise, for example, input devices such as e.g. mouse, keyboard, touchpads or the like.

The network cited in the introduction, in which, among other things, high-resolution video signals are transmitted, is formed via these components. It comprises a number of network devices according to one or more example embodiments of the present invention, which are connected to one another in a known network topology. In addition, it may also comprise further components, as described above. This means that the network and its topology are configured and parameterized for the particular application case. The network devices, their components and their connection to one another are therefore known and are taken into account at the time of the, preferably automatically optimized, generation of the address scheme. Via the address scheme, a route through the network from the source to the sink is specified for each data stream.

The method cited in the introduction for processing and transmitting data comprising at least high-resolution video data in a network comprises the following steps, which are implemented via an integrated switching arrangement. In one step, at least high-resolution video data is received and/or sent in data streams. In a further step, the integrated switching arrangement is connected to a number of substantially identical, spatially separated, integrated switching arrangements via the network interfaces in the network for the purpose of transmitting data. In a further step, the video data from one or more data streams is stored as a combined frame of video data in a frame buffer and/or is read out therefrom. In a further method step, the data is exchanged between components of the integrated switching arrangement via a connection matrix. In the process, routes for individual data streams are specified via a configurable addressing scheme.

In the method, the order of the steps is not fixed and during normal operation the steps are usually executed in parallel. Depending on configuration, a network device can therefore receive video data serially from one or more sources and then forward said data serially to one or more further network devices. Alternatively, it can receive video data serially from the network and forward said data serially to one or more video sinks. Equally, it is possible for both processes to be executed in parallel in one network device and/or for one or more video streams to be processed in parallel.

A majority of the aforementioned components of the network device can be realized wholly or in part in the form of integrated circuits or logic arrays.

In principle, however, some of these components can also be realized in the form of software-assisted hardware, for example FPGAs, ASICs or the like, in particular when there is a need to perform particularly fast calculations. Similarly, the required interfaces may be embodied as software interfaces, for example when it is simply a matter of importing data from other software components. They may, however, also be embodied as hardware-based interfaces which are controlled by suitable software.

An implementation realized mostly in the form of software has the advantage that network devices already used previously in the prior art can also be easily upgraded via a partial retrofit and a software update or reconfiguration of the integrated switching arrangement (FPGAs) in order to operate in the manner according to one or more example embodiments of the present invention. To that extent, the object is also achieved via a corresponding computer program product which can be configured into a programmable logic array of a network device, having program sections or logic instructions for performing steps of the method according to one or more example embodiments of the present invention when the logic is executed in the network device. As well as the computer program, such a computer program product may where necessary comprise additional constituent parts such as e.g. a set of documentation and/or additional components, including hardware components, such as e.g. hardware keys (dongles, etc.) to enable use of the software.

A computer-readable medium, for example a memory stick, a hard disk drive or some other transportable or permanently installed data medium, on which the program sections of the computer program that are programmable and executable on the integrated switching arrangement are stored, may be used for transporting the computer program product to the network device and/or for storing the same in the network device. For this purpose, the integrated switching arrangement may have e.g. one or more cooperating logic elements or the like.

Further particularly advantageous embodiments and developments of the invention will become apparent from the dependent claims as well as from the following description, wherein the claims of one claims category may also be developed analogously to the claims and parts of the description relating to a different claims category and in particular also individual features of different exemplary embodiments or variants may be combined to form new exemplary embodiments or variants.

The integrated switching arrangement preferably comprises a number of video processing units which can be configured for processing the video data.

They are preferably embodied in such a way that they each perform or are able to perform a typical video processing process on the switching arrangement. In particular, this is accomplished in each case for a video data stream or video stream. This is accomplished in particular independently of the other video data streams. The typical video processing processes comprise, inter alia, scaling, e.g. of the resolution, the color space or the frame rate, clipping, filtering, e.g. of color, noise or the like, line reconstruction, compression or decompression. These image processing processes and their implementation in software or hardware are well-known to the person skilled in the art. The video processing units can be configured in such a way that e.g. a scaling factor is set, a size and/or position of an image section is set, filter coefficients are set or the like.

The video processing units are preferably embodied for scaling, clipping, filtering, line reconstruction, compression and/or decompression.

The video processing units are therefore implemented via the integrated switching arrangement and consequently operate in a very time-efficient manner. This enables the latency to be kept low overall. The scaling in this case preferably comprises a scaling of the resolution, the frame rate and/or the color space. The filtering preferably comprises a color filter, a contrast filter, an edge filter and/or a noise filter. The implementation of the video processing units in terms of software and/or hardware is basically known to the person skilled in the art.

Particularly preferably, the video processing units are embodied to perform precisely one of these processes. In other words, the video processing units are embodied in each case for scaling, clipping, filtering, line reconstruction, compression or decompression. As a result it is possible to apply the processes individually to the video signal as and when required. In this case, however, a plurality of the video processing units can act on the video signal in succession, as a result of which a combination of the individual processes continues to be achieved.

The network interfaces preferably have a data rate greater than or equal to 5 Gbps, preferably greater than or equal to 10 Gbps. At a data rate of 5 Gbps, HD video signals can be transmitted uncompressed. Two network interfaces, each operating at a data rate of 10 Gbps, are preferably bundled or combined for the uncompressed transmission of 4K video signals.

The physical interfaces of a network device, in particular the network interfaces, are preferably embodied as slots. They can be populated as necessary, e.g. via SFP modules. This enables the bandwidth of the network to be adjusted and costs for unnecessary interfaces can be avoided.

Preferably, therefore, a number of network interfaces, i.e. for example two or four network interfaces that are connected to the same further integrated switching arrangement, can generally be bundled in order to provide a proportionally higher bandwidth for the video signal that is to be transmitted.

The video data preferably comprises at least high-resolution video data or video signals (according to the HD video standard). What is understood by this within the meaning of one or more example embodiments of the present invention is video data having at least the HDTV-typical image resolution of 1280×720 pixels at an image refresh rate or frame rate of 50 fps. Preferably, however, the resolution is equal to 1920×1080 pixels. Lower-resolution video signals can of course also continue to be processed and transmitted via the integrated switching arrangement.

Particularly preferably, the video data comprises ultra-high-resolution video data (according to the UHD video standard). By "ultrahigh-resolution video data" is to be understood video data having a resolution of 4K or more. "4K" means that the resolution lies in the order of 4000 pixels per line, in other words e.g. 3840, 4096 or the like. Particularly preferably, the video data also comprises video data at a resolution of 8K (approx. 8000 pixels per line). This is particularly advantageous in order to achieve an accurate, detailed representation on larger display means also.

Preferably, each data stream of video data is allocated a position in the frame buffer via the frame buffer controller such that the arrangement of the video data of the respective data stream is defined in a frame. In the process, the frame buffer controller also controls—particularly preferably in accordance with the specification of a user—i.e. via the respective position at which the frames of the individual original video signals are stored in each case in the frame buffer, the position in the resulting combined video frame. Advantageously, the individual video signals can therefore be combined according to requirements.

The frame buffer is preferably embodied as a multi-layer frame buffer. A plurality of layers or image layers can be stored and retrieved simultaneously in the multi-layer frame buffer via the frame buffer controller and the frame buffer interface. In this case the frame buffer controller preferably comprises a layer controller which, from the individual layers, generates, e.g. via alpha blending, a new video signal that is to be read out. At least two image layers are required for this purpose, e.g. a foreground layer and a background layer. However, further image layers still can be embodied in the frame buffer, such as e.g. a layer for a mouse pointer, as is described hereinbelow.

The integrated switching arrangement preferably comprises a mouse pointer control unit, which provides an image of a mouse pointer and assigns it to defined positions in the frame buffer.

Particularly preferably, the mouse pointer control unit provides a number of images of a mouse pointer, which are selected according to the particular context, e.g. a normal mouse pointer is chosen in the normal state, whereas a load icon or wait icon is chosen as the mouse pointer in the loading state, or the like.

The mouse pointer is preferably assigned to a position in the frame buffer as a function of a user input, in particular a mouse input. If the frame buffer is embodied as a multi-layer frame buffer, the mouse pointer or its image is preferably stored at the corresponding position in the image layer assigned to it. This user input is communicated to the mouse pointer control unit and subsequently to the frame buffer e.g. via an input device connected to a (proxy) processor, in particular via a USB signal transmitted via Ethernet, as will be explained in more detail later. Advantageously, this also enables a display of a user interface to be realized in the combined video signal.

In addition or alternatively, the integrated switching arrangement preferably has a window control unit which, if there is a shift in the position of a data stream of video data in the frame buffer, resets the positions becoming free.

Advantageously, therefore, it is ensured via the window control unit that only the latest information is contained in the combined video signal. This can be realized for example by setting the corresponding positions to a background value or by setting an alpha value of the previously stored video signal to zero.

The addressing scheme is preferably specified for the entire network at the time the network is configured or installed. It preferably comprises an internal component address via which the route for the exchange of data streams via the connection matrix is specified. Furthermore, the addressing scheme preferably comprises a network address via which at least one route for the exchange of the respective data stream via the network is specified.

Before the data of a data stream or data packet leaves a component, the component address is set to the address of the next destination component of the network device. This can be accomplished statically for example for a portion of the components, i.e. data from said component is continually sent to the specified destination component only. At the same time, however, the destination component can also be reconfigured as necessary. Other components, such as e.g. the network interfaces or the Ethernet interface, can set the component address based on the network address or on an Ethernet address—e.g. with reference to lookup tables. For video data streams that are newly imported into the network from video sources, both the network address and the component address are set in the video interface.

Depending on application case, there is a need to transmit the video signal of a video source to multiple video sinks or quite generally to transmit a signal to multiple destination locations and where appropriate to output it at said locations. Preferably, a data stream is duplicated as required in accordance with the addressing scheme in order to be sent to multiple destinations in the network. Whereas addresses called "unicast addresses" are provided in the addressing scheme for the transmission to a single video sink, addresses called "multicast addresses" are provided for the transmission of a video signal from one video source to multiple video sinks. A multicast address not only allocates a route to the corresponding signal, but also specifies a transmission tree or branching map starting from the video signal source. For this purpose, the signal is duplicated or multiplied in a correspondingly specified network interface for example and then sent on the different routes specified by the addressing scheme, if necessary with further branches.

In other words, the addressing scheme therefore controls the routing and, if necessary, also the duplication of data streams in the network. Additional devices such as routers or switches are therefore not required since this functionality is already incorporated in the integral network device according to one or more example embodiments of the present invention or in its integrated switching arrangement.

The integrated switching arrangement preferably comprises an Ethernet interface for receiving and/or sending Ethernet data and an Ethernet control unit which sends the Ethernet data in accordance with the addressing scheme.

The addressing scheme preferably comprises a translation of Ethernet addresses into network addresses or component addresses, e.g. in the form of an Ethernet lookup table. In other words, for the purpose of transmission in the network according to one or more example embodiments of the present invention, the Ethernet address is converted into the addressing scheme of the network according to one or more example embodiments of the present invention.

In this case the Ethernet data particularly preferably comprises HID (Human Interface Device) data from USB devices having known profiles in each case. Basically, the USB standard, due to the response times specified therein, actually provides no compatibility for the transmission via Ethernet; if profiles of the USB data are known—i.e. for example the profile of a keyboard or mouse input—it is possible to simulate the corresponding responses in order to control the setting up or clearing down of a USB connection and avoid the repeated sending of the USB packets. These steps are preferably realized via corresponding software which is executed in each case on a processor of a network device. Thus, it is advantageously also possible to transmit HID data with known profiles in the form of Ethernet data over the network according to one or more example embodiments of the present invention. Accordingly, the network device therefore comprises the function of a KM switch (keyboard/mouse switch).

The network device preferably comprises a frame buffer in which at least one frame of video data can be temporarily stored before it is sent via a video interface and/or a network interface. The frame buffer is in this case connected to the integrated switching arrangement via the frame buffer interface and is controlled via the frame buffer controller, as already described hereinabove.

The network device preferably comprises a processor which is connected to the integrated switching arrangement via an Ethernet interface. The processor configures among other things the addressing scheme and/or image processing parameters as required via a User Datagram Protocol (UDP) unit incorporated in the integrated switching arrangement.

The processor processes e.g. user inputs and sends corresponding UDP data via an Ethernet connection via the Ethernet interface to the UDP unit. The UDP unit translates the UDP data into a suitable format for write accesses to the connection matrix or to the other components of the network device.

Corresponding instructions for reconfiguring the addressing scheme or the image processing parameters can be transmitted as UDP data, like other Ethernet data also, via the network to the network devices or to the respective destination network device.

For security reasons it may be desirable to perform the described control or configuration of the network solely via one network device. This network device is referred to as a proxy network device and is connected to an external computing unit via the Ethernet interface. A user therefore issues commands for controlling the network, i.e. in particular for the routing of the video signals and/or the control of the video signal sources, to the proxy network device via the computing unit. The proxy network device then forwards the commands in accordance with the addressing scheme. The communication taking place internally in the network therefore remains hidden from a user. Furthermore, apart from the proxy network device, the communication in the network via the Ethernet data preferably runs decoupled from external networks.

Figure 1:
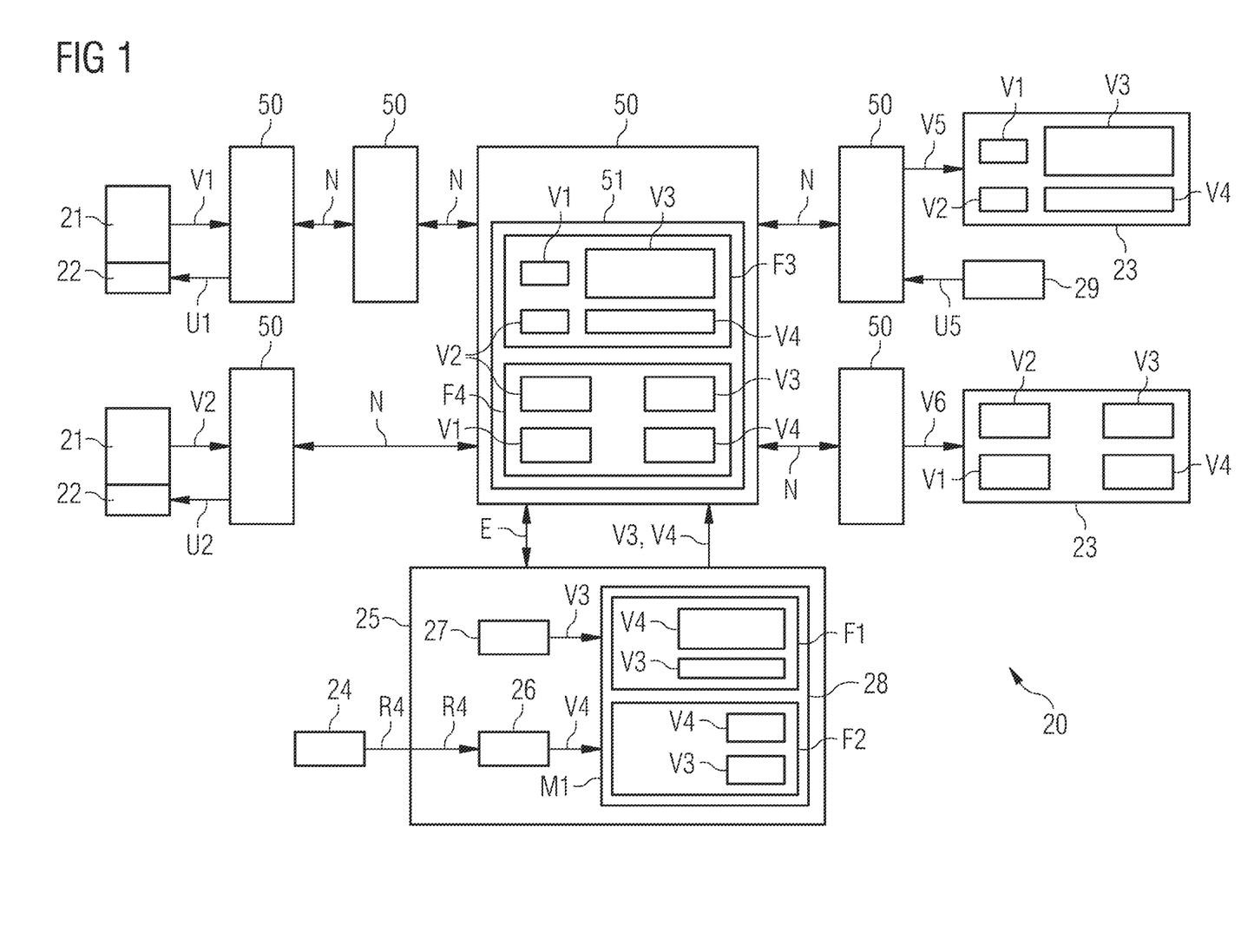
FIG. 1 shows a schematic block diagram of an exemplary embodiment of a network according to the invention.

FIG. 1 shows by way of example an inventive network 20 in the form of a block diagram. In this exemplary embodiment, the network 20 comprises six network devices 50, which are implemented substantially identically. However, it is easily possible to modify the number and the arrangement of the network devices 50 according to requirements or application case. One of the network devices is connected to a computing unit 25 or computer 25. It is also referred to below as the proxy network device 50. Via the computer unit 25 it is possible, among other things, to send instructions for configuring the network 20 as Ethernet data E to the network device 50 via an Ethernet connection.

Two of the network devices 50 are connected to video signal sources 21. The video signal sources 21 can be implemented as cameras, for example, though in this case they may also be for example video signals generated by software, originating from medical imaging modalities such as X-ray devices, for example, or even be output as a video signal from measurement devices such as an ECG or EEG, for example.

The video signal sources 21 transmit their video signals V1, V2 to the respective network devices 50 connected to them. The network device 50 to which the video signal V2 is sent is directly connected to the proxy network device 50. The network device 50 to which the video signal V1 is sent is indirectly connected to the proxy network device 50 via a further network device 50. The video signal sources 21 each have a control unit 22 to which USB data U1, U2 containing control commands is sent by the respective connected network device 50. Settings of the video signal sources 21, such as e.g. focus settings, zoom settings, alignment settings or the like, can be controlled by this means.

The network devices 50 send network data N to one another. The network data N consists of special data packets containing, among other things, the video signals V1, V2, V3, V4, Ethernet data E, and USB data U1, U2 as payload. In addition to containing payload, the network data N includes transmission control data comprising address data, checksums or the like.

The computer unit 25 is connected to a medical imaging modality 24 in the form of a computed tomography system 24. The computed tomography system 24 sends raw data R4 to the computer unit 25. In the computer unit 25, the raw data R4 is reconstructed via a reconstruction unit 26 and forwarded as a video signal V4 to a frame buffer 28. A video signal V3 generated by software is sent to the frame buffer 28 in addition. The two video signals V3, V4 are stored therein in two different frames F1, F2. The two frames F1 and F2 differ in terms of the scaling of the video signals V3, V4. Here, by way of example, the video signals V3 and V4 in frame F1 are more elongated in shape in the horizontal direction than in frame F2. The scaling can be set as required by a user in this case. The frame buffer 28 is therefore written at a frame rate present in each case in the video signal and if necessary is read out at a different frame rate, in which case an arbitration logic can prevent any conflicts between read and write accesses.

The video signals V3, V4 or the frames F1, F2 in which they are contained are sent to the proxy network device 50. In the proxy network device 50, the video signals V3, V4 of the frames F1 and F2 are merged in the frame buffer 51 with the video signals V1, V2 from the other video signal sources 21 into the frames F3, F4. The individual video signals V1, V2, V3, V4 in the frames F3, F4 are scaled in accordance with the user specifications.

The frames F3, F4 are packed into network data N as a combined video signal for sending and are transmitted to network devices 50 which are connected to video signal sinks 23 or output means 23 in the form of monitors, displays or the like. From these network devices 50, the image contents of the frames F3, F4 are sent as combined video signals V5, V6 to the output means 23 and are represented there as video. The network device 50 which outputs the video signal V5 is furthermore connected to a USB input device 29 such as a mouse or keyboard, for example. The USB input device 29 enables control data for example to be captured as USB data U5, which is transmitted as required via the network 20 to the control units 22 of the video signal sources 21.

Via the inventive network 20, therefore, video signals V1, V2, V3, V4 from different video signal sources 21, 26, 27 can be captured as required, processed and/or combined, transported over different routes through the network and output via video sinks 23 chosen by a user. The functionality of the network devices 50 is explained in detail below with reference to FIG. 2.

The network 20 is embodied according to its configuration and therefore possesses a known topology. This allows the routes between the network devices 50, the components incorporated in them and the components connected to them to be identified and recorded in an addressing scheme. Via the addressing scheme it is therefore possible to establish the route from one point in the network 20 to another point in the network 20 and thus forward the corresponding data streams as required.

Figure 2:
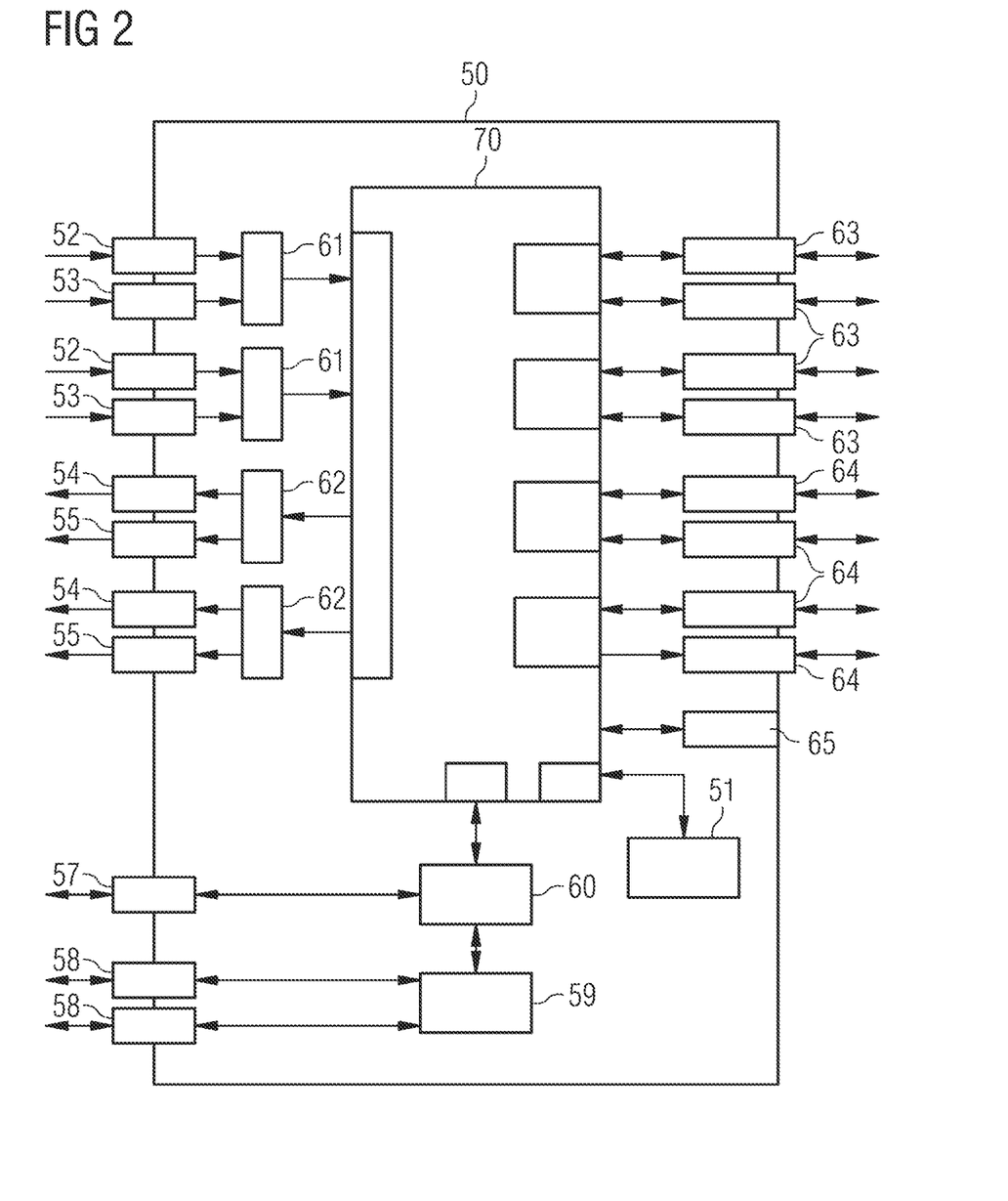
FIG. 2 shows a schematic block diagram of an exemplary embodiment of a network device according to the invention.

FIG. 2 shows by way of example an inventive network device 50 as a schematic block diagram. As its central component, the network device 50 comprises an integrated switching arrangement 70, which in this example is embodied as an integrated circuit 70, in particular as an FPGA. The integrated circuit 70 is described in detail below with reference to FIG. 3.

The network device 50 has physical plug-in ports 52, 53, 54, 55 for video signals. Two DisplayPort inputs 52 and two HDMI inputs 53 serve to receive video signals. One DisplayPort input 52 and one HDMI input 53 are connected in each case to a common multiplexer 61, only one of the two inputs 52, 53 being used at any given time. Both HDMI and DisplayPort have four signal pins or lanes each. The lanes of the plug-in port 52 or 53 used are combined onto one signal line via the multiplexer 61 and transferred to the integrated circuit 70.

Conversely, the integrated circuit 70 outputs a multiplexed video signal to a demultiplexer 62, which outputs the combined video signal separated onto different lanes in accordance with the standard of the respective connected output 54, 55. Two DisplayPort outputs 54 and HDMI outputs 55 are embodied in each case for sending the video signals, one DisplayPort output 54 and one HDMI output 55 being connected in each case to a common demultiplexer 62, though only one of the outputs is used at any given time.

The DisplayPort ports in this case support the standard known as DisplayPort Multi-Stream Transport (DP-MST), in which at least two video signals can be transmitted via one DisplayPort port.

The described embodiment of the video signal inputs 52, 53 and video signal outputs 54, 55 takes into account that often one type of connection predominates at the location at which the network 20 is installed. The network devices 50 should in principle also be deployed in a single design type at different locations which may possibly require different types of connection. Other video plug-in ports, such as e.g. VGA, S-Video or DVI, can be adapted if necessary.

The network device 50 further comprises eight network ports 63, 64. Of these, four are embodied as SFP modules 63 and can be populated with SFP transceivers according to requirements in order to save on costs for the comparatively expensive transceivers. Depending on the distance requiring to be bridged, the SFP transceivers can be embodied as single-mode or multi-mode transceivers and can support e.g. transmission rates of 5 Gbps or 10 Gbps, as required. The remaining four network ports are embodied by way of example as PCIe ports 64, enabling the network device 50 to be incorporated also as a plug-in module into a suitable device if necessary, e.g. into a computing unit or a medical imaging modality.

The number of video ports 52, 53, 54, 55 and network ports 63, 64 of the network device 50 is substantially dependent on the processing capacity of the integrated circuit 70 and furthermore can be chosen as desired during the configuration of the network device 50.

The network device 50 additionally features an expansion slot 65 which can be used as required as a Full HD output, SPDIF audio output, for older video standards (S-Video, FBAS), as UART or CAN ports or for binary inputs and/or outputs.

The network device 50 also has a frame buffer 51 in the form of one or more DDR RAM modules which is embodied as a multi-layer frame buffer. The management of the frame buffer 51 is described in detail below with reference to FIG. 3.

In addition, the network device 50 comprises a processor 59 which is connected to an Ethernet switch 60 on one side and to two USB ports 58 on the other. One of the USB ports 58 is connected to the device port of the processor 59, the processor emulating via software a USB input device which outputs the USB data U1, U2 (with known profile) received via the network 20 to devices that are to be controlled. The other USB port 58 is connected to the host port of the processor 59 and converts the USB data U3 (with known profile) received from an input device into Ethernet data E, which is sent as network data N via the network 20.

The Ethernet switch 60 is additionally connected to an Ethernet port 57 via which it exchanges Ethernet data bidirectionally. Both the Ethernet data from the Ethernet port 57 and that from the processor 59 are transferred to the integrated circuit 70 via the Ethernet switch 60.

Figure 3:
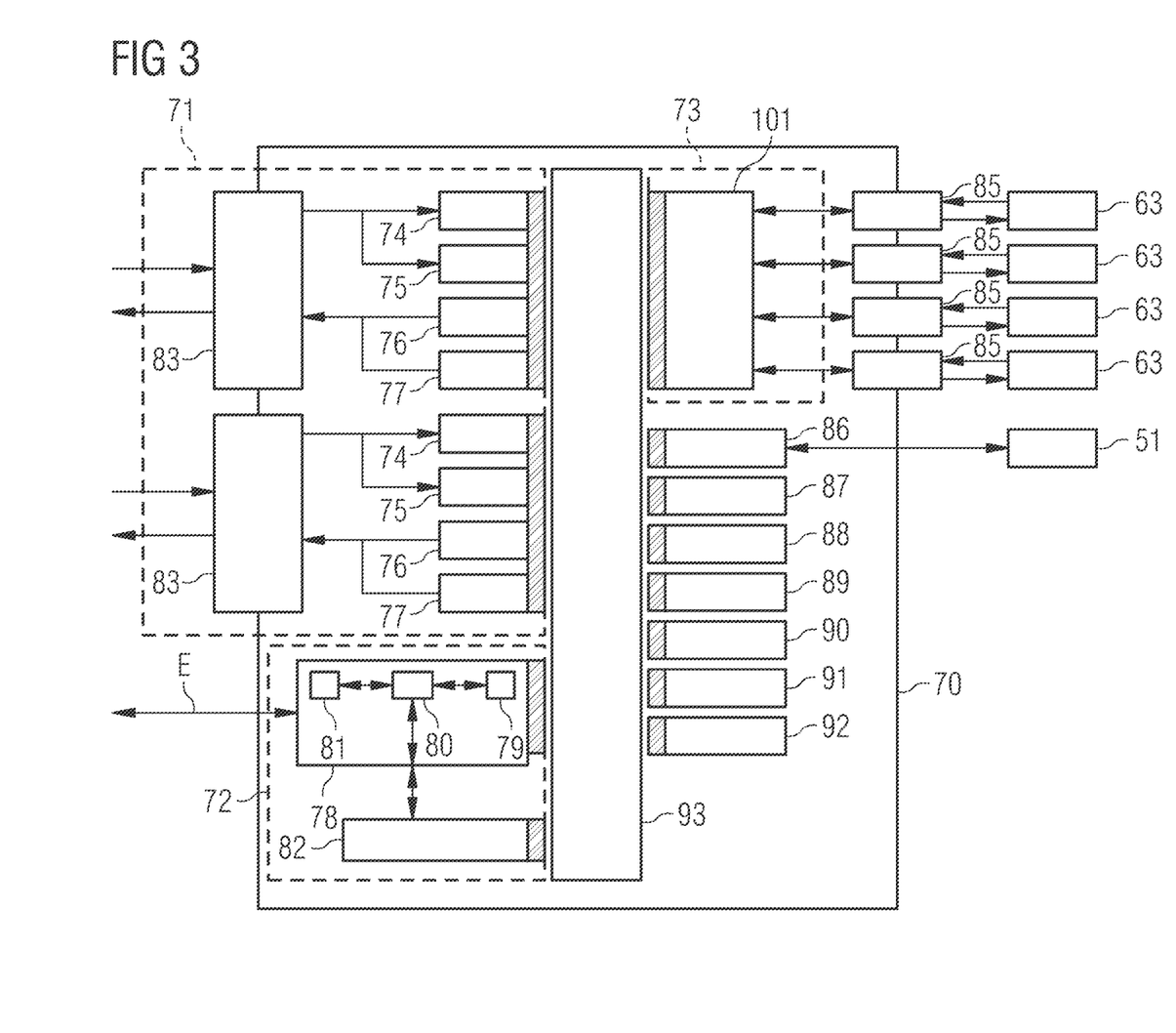
FIG. 3 shows a schematic block diagram of an exemplary embodiment of a switching arrangement according to the invention.

FIG. 3 shows by way of example an inventive integrated circuit 70 in the form of a FPGA as a schematic block diagram. The integrated circuit 70 comprises a video module 71, an Ethernet module 72 and a network module 73. The outputs or inputs of the individual network interfaces 85 are connected to the network ports 63 of the network device 50 which are embodied as SFP transceivers. The network module 73 is described in detail below with reference to FIG. 5.

The video module 71 has two identically embodied combined video input/output interfaces 83, each of which is connected to a multiplexer 61 and a demultiplexer 62 of the network device 50. Via a combined video input/output interface 83, an incoming video signal and an outgoing video signal can be forwarded simultaneously in the corresponding direction. Depending on the standard on which it is based, an incoming video signal is forwarded either to a DisplayPort connection matrix input interface 74 or to an HDMI connection matrix input interface 75. Depending on the standard on which it is based, an outgoing video signal is received via the connection matrix 93 at a DisplayPort connection matrix output interface 76 defined on the basis of the component address of the addressing scheme or at an HDMI connection matrix output interface 77, and is forwarded via the combined video input/output interface 83 connected thereto to the corresponding demultiplexer 62 of the network device 50.

The Ethernet module 72 comprises an Ethernet interface 78 and a UDP interface. The Ethernet interface 78 has an Ethernet filter 81 which allows only Ethernet data E to pass through to defined network addresses in order to avoid irrelevant data streams.

The Ethernet interface 78 further comprises a buffered repeater 80 which decides on the forwarding of the individual packets of Ethernet data E. Outgoing Ethernet data E is forwarded via the Ethernet filter 81 to the Ethernet switch 60 of the network device 50; in the case of incoming Ethernet data E, a decision is made as to whether this is UDP data that is to be forwarded to a UDP interface 82 or Ethernet data E that is to be forwarded over a specific route in the network 20. In the latter case, the Ethernet data E is provided with a network address and a component address based on its Ethernet address or MAC address in an Ethernet connection matrix interface 79 using an Ethernet lookup table and is forwarded accordingly via the connection matrix 93.

The processors 59 of the respective network devices 50 in the network 20 can also communicate with one another via said Ethernet interface 78.

The integrated circuit 70 further comprises a frame buffer controller 87 and a frame buffer interface 86. In this case the frame buffer controller 87 controls accesses to the frame buffer 51 of the network device 50 via the frame buffer interface 86 in such a way that video data V1, V2, V3, V4, V5, V6, V7, V8 from one or more data streams can be stored in the frame buffer 51 as a combined frame F3, F4 of video data and/or can be read out from the frame buffer 51.

For this purpose, each data stream of video data V1, V2, V3, V4, V5, V6, V7, V8 is allocated a position in the frame buffer 51 via the frame buffer controller 87 such that the arrangement of the video data of the respective data streams is defined in a combined frame F3, F4. Via the respective position at which the frames of the individual original video signals V1, V2, V3, V4, V5, V6, V7, V8 are stored in the frame buffer 51 in each case, the frame buffer controller 87 therefore also controls—in particular according to a specification by a user—the position in the resulting combined video frame F3, F4.

The integrated circuit 70 further comprises a mouse pointer control unit 88 which provides several images (depending on stats, normal mouse pointer, loading icon, etc.) of a mouse pointer and following a user input, e.g. via a mouse or touchpad, assigns the same to defined positions in the frame buffer 51. The data of said user input can e.g. also be transmitted to the mouse pointer control unit 88 over the network as Ethernet data E.

The integrated switching arrangement 70 also has a window control unit 89 which, if there is a shift in the position of a data stream of video data V1, V2, V3, V4, V5, V6, V7, V8 in the frame buffer 51, resets the positions becoming free.

It is therefore ensured via the window control unit 89 that only the latest information is contained in the combined video signal. This can be accomplished for example by setting the corresponding positions to a background value or by setting an alpha value of the previously stored video signal to zero. This is possible because the frame buffer 51 is embodied as a multi-layer frame buffer 51. If the alpha value of an image layer is set to zero, the layers lying thereunder become visible or are displayed.

The video processing units 90, 91, 92 can be chosen as required during the layout phase of the integrated circuit 70 or at the time of its basic configuration. In other words, it is possible in principle to deploy either more or fewer of the video processing units. A plurality of video processing units of the same type may also be present, e.g. in order to process multiple different video signals in a similar manner.

In this exemplary embodiment, one video processing unit is embodied as a first scaling unit 90, another is embodied as a second scaling unit 91, and one video processing unit is embodied as a (color) filter unit 92.

Figure 4:
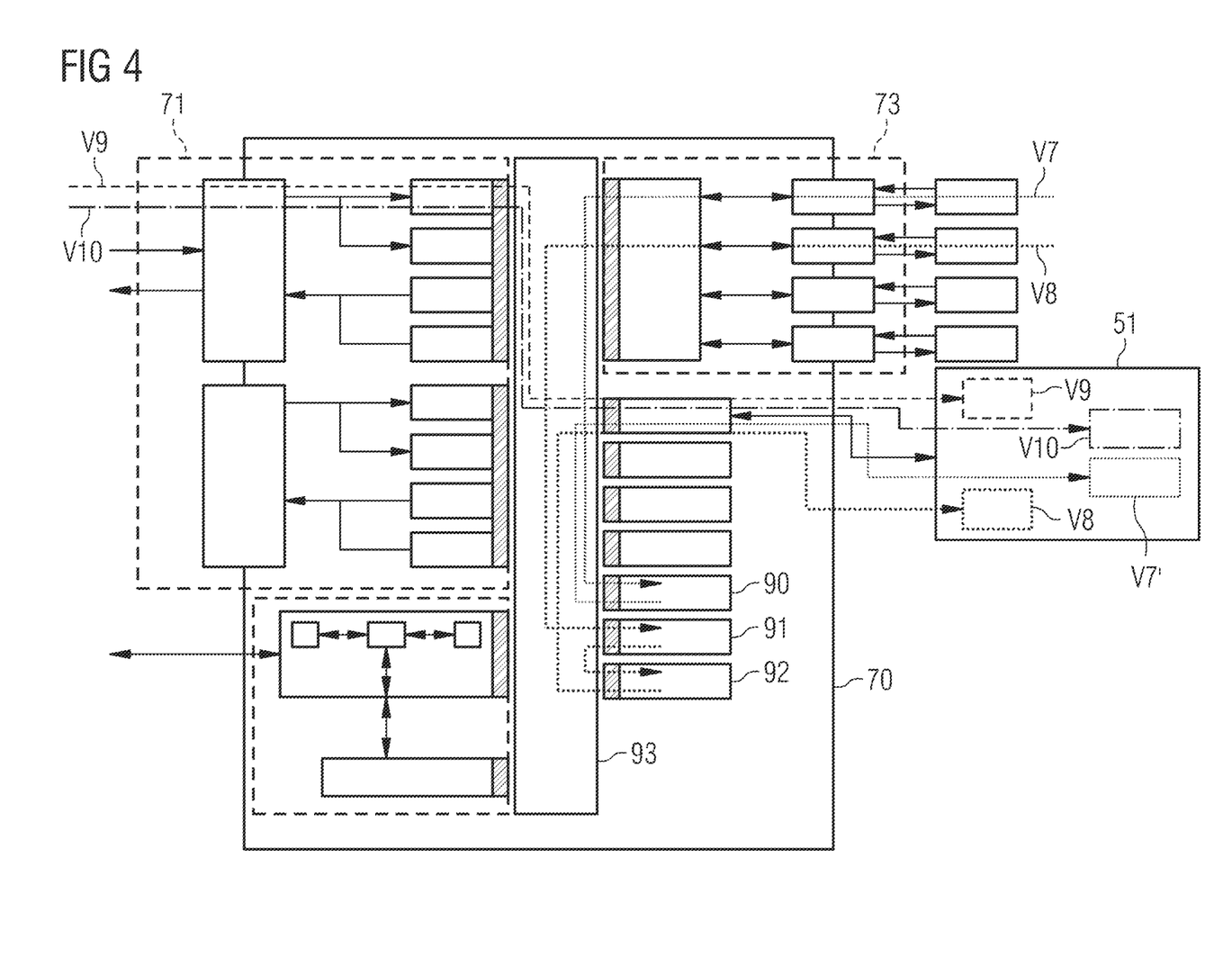
FIG. 4 shows the switching arrangement from FIG. 3 with example routes for video signals.

FIG. 4 illustrates by way of example the routes of different video signals V7, V8, V9, V10 in the integrated circuit 70 from FIG. 3.

A first video signal V9 and a second video signal V10 are received as DisplayPort Multi-Stream Transport (MST) and forwarded as individual data streams to the frame buffer interface 86. The frame buffer interface 86 stores the first video signal V9 and the second video signal V10 as directed by the frame buffer controller 87 at the corresponding positions in the frame buffer 51.

A third video signal V7 is received via a first network interface 85 and forwarded in accordance with the addressing scheme to an image processing unit in the form of a first scaling unit 90. The first scaling unit 90 scales the size of the third video signal V7 and forwards it, changing the component address in the process, to the frame buffer interface 86, which stores the scaled third video signal V7' at the position in the frame buffer 51 allocated to it by the frame buffer controller 87.

A fourth video signal V8 is received via a second network interface 85 and forwarded in accordance with the addressing scheme to the second scaling unit 91. The second scaling unit 90 scales the size of the third video signal V7 and forwards it, changing the component address in the process, to the (color) filter unit 92. In the color filter unit 92, the blue tones, for example, are filtered out from the video signal and the video signal is then forwarded, the component address being changed in the process, to the frame buffer interface 86, which stores the scaled and filtered fourth video signal V8' at the position in the frame buffer 51 allocated to it by the frame buffer controller 87.

The frame buffer 51 can then be read out in its entirety and thus provides a new combined video signal. This can be sent onward over the network 20 or output via one of the video interfaces 83.

Figure 5:
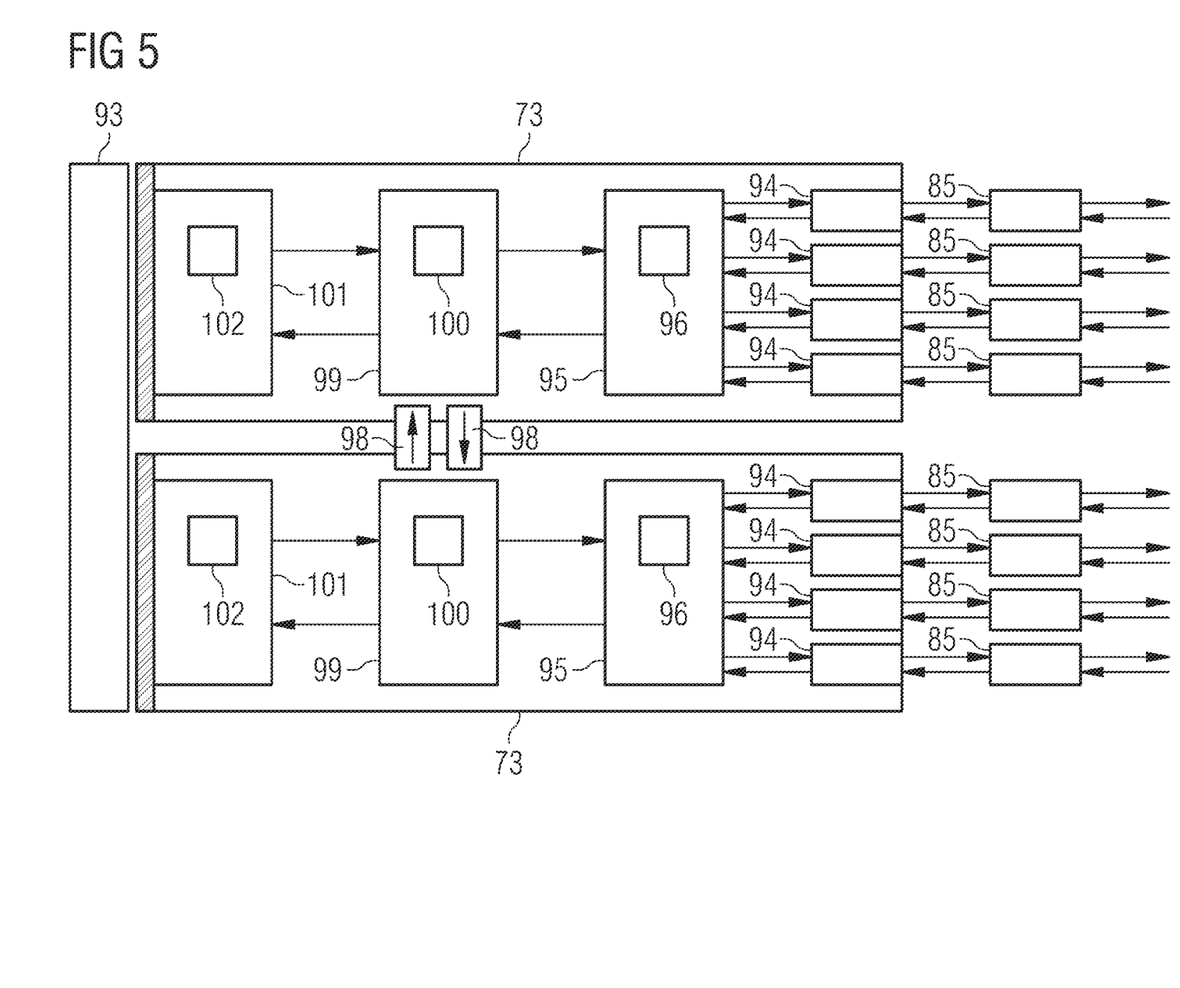
FIG. 5 shows a schematic block diagram of two network interfaces for a switching arrangement according to one or more example embodiments of the present invention.

Two network modules 73 similar to the network module 73 depicted in FIG. 3 are shown by way of example in FIG. 5. The two network modules 73 are of identical construction and are therefore described jointly.

The network module 73 is connected to the connection matrix 93 via a network connection matrix interface 101. It receives the data sent to its component address via said interface and sends data to other component addresses also via said interface. The network connection matrix interface 101 has a connection matrix lookup table 102 in which there is stored information indicating whether a route is currently active or not. Routes can therefore be easily activated or deactivated via the configuration of the connection matrix lookup table 102, without changing the addressing scheme itself.

The connection matrix interface 101 is connected to a routing unit 99 for the purpose of bidirectional data transmission. With the aid of the addressing scheme, the routing unit 99 decides via a routing lookup table 100 to which internal component addresses or via which network interface 85 the incoming network data N is sent. In other words, for each device-external network address it is specified in the routing lookup table 100 via which network interface 85 the data will be sent.

When incoming data arriving from the network 20 is intended according to the addressing scheme directly for a component of the home device or a multicast address is also intended for the home device, the data is forwarded or, as the case may be, duplicated and forwarded according to the addressing schemes via the routing lookup table 100 to the corresponding component address of the home device.

When incoming data arriving from the connection matrix 93 is intended for a component of the home device, which is the case when for example an incoming signal from a video source has a multicast address, the corresponding signal is firstly copied and forwarded to the internal component and secondly forwarded according to the multicast address to further components or network devices 50.

When incoming data arriving from the connection matrix 93 is intended for a different network device, said data is forwarded according to the addressing scheme via the routing lookup table 100 via the corresponding network interface 85.

When incoming data arriving from the network 20 is intended for a different network device, said data is forwarded according to the addressing scheme via the routing lookup table 100 to the corresponding network interface 85. Should it be necessary with this type of forwarding for the data requiring to be sent via a network interface 85 which is not connected to the same network module 73, the data is forwarded via a direct module connection 98 from the routing unit 99 to the routing unit 99 of the respective other module and from there is sent again according to the addressing scheme via the routing lookup table 100 via the corresponding network interface 85.

The network module 73 additionally comprises a bundling unit 95 which is likewise connected to the routing unit 99. This enables the data rate of two or more network interfaces 85 to be bundled as needed in order for example to transmit a 4K video signal uncompressed from one network device 50 to another. The bundling unit 95 can for example bundle four individual network interfaces 85 to form a virtual interface with correspondingly higher data transmission rate up to 40 Gbps. In this case a bundling control unit 96 of the bundling unit 95 controls the allocation of the data to the individual network interfaces 85 such that data that has to be recombined arrives as near as possible simultaneously at the destination network device 50.

Finally, the data is converted in each case via an HSSL unit 94 and forwarded to the respective network interface 85.

The inventive integrated circuit 70 therefore enables an inventive network device 50 already to realize the essential steps of video technology. Accordingly, the functions that previously needed to be assumed by different devices are now handled by the integrated and substantially uniform devices according to one or more example embodiments of the present invention.

In conclusion, it is pointed out once again that the devices and methods described in detail in the foregoing are simply exemplary embodiments which may be modified in the most diverse ways by the person skilled in the art without leaving the scope of the invention. Furthermore, the use of the indefinite articles "a" or "an" does not exclude the possibility that the features in question may also be present more than once. Similarly, the term "unit" does not rule out the possibility that this consists of a plurality of components which—unless described otherwise—may also be distributed in space if necessary. In the case of the network devices, however, these are explicitly integral units which comprise all the specified components in one constructional unit.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. An integrated switching arrangement for processing and transmitting data comprising at least video data in a network, the integrated switching arrangement comprising:
   a number of video interfaces configured to at least one of receive or send the video data in data streams;
   a number of network interfaces configured to connect the integrated switching arrangement to a number of other spatially separated integrated switching arrangements, the other spatially separated integrated switching arrangements configured to transmit at least the video data;
   a frame buffer controller and a frame buffer interface, the frame buffer controller configured to control access to a frame buffer, via the frame buffer interface such that the video data from one or more of the other spatially separated integrated switching arrangements can be at least one of stored in the frame buffer as a combined frame of the video data from one or more of the other spatially separated integrated switching arrangements or read out from the frame buffer; end
   a connection matrix configured to receive and transmit the data streams between the number of video interfaces, the number of network interfaces, and the frame buffer interface; and
   processing circuity configured to cause the integrated switching arrangement to
      allocate a position of each data stream of the video data in the frame buffer such that the arrangement of the video data of the respective data streams is defined in the combined frame, and
      reset the positions if there is a shift in a position of one of the data streams of video data in the frame buffer,
   wherein routes of the data streams are specified via a configurable addressing scheme.

2. The integrated switching arrangement of claim 1 comprising:
   a number of video processing units configured to process the video data.

3. The integrated switching arrangement of claim 2, wherein the video processing units are configured to process the video data, the processing including at least one of scaling, clipping, filtering, line reconstruction, compression or decompression.

4. The integrated switching arrangement of claim 1, wherein a data rate of the network interfaces is greater than or equal to 5 Gbps.

5. The integrated switching arrangement of claim 1, wherein the video data comprises at least high-resolution video data.

6. The integrated switching arrangement of claim 1, father wherein the processing circuitry is further configured to cause the integrated switching arrangement to:
   provide an image of a mouse pointer and assign the mouse pointer to defined positions in the frame buffer.

7. The integrated switching arrangement of claim 1, further comprising:
   an Ethernet interface configured to at least one of receive or send Ethernet data,
   wherein the processing circuitry is further configured to cause the integrated switching arrangement to send the Ethernet data in accordance with the addressing scheme.

8. The integrated switching arrangement of claim 7, wherein the processing circuitry is further configured to cause the integrated switching arrangement to:
   provide an image of a mouse pointer and assign the mouse pointer to defined positions in the frame buffer.

9. The integrated switching arrangement of claim 8, wherein the addressing scheme comprises an internal component address via which a route for exchanging the data streams via the connection matrix is specified.

10. The integrated switching arrangement of claim 1, wherein the addressing scheme comprises an internal component address via which a route for exchanging the data streams via the connection matrix is specified.

11. A network device comprising:
    the integrated switching arrangement of claim 1; and
    physical interfaces which are connected to corresponding interfaces of the integrated switching arrangement.

12. The network device of claim 11, further comprising:
    a processor connected to the integrated switching arrangement via an Ethernet switch, the processor configured to configure the addressing scheme or image processing parameters via a User Datagram Protocol (UDP) unit of the integrated switching arrangement.

13. A network comprising at least one network device, the at least one network device being the network device of claim 11.

14. A method for processing and transmitting data comprising at least video data in a network, said method comprising:
    at least one of receiving or sending video data in data streams;
    connecting the integrated switching arrangement of claim 1 to the other spatially separated integrated switching arrangements in the network;
    at least one of storing or reading out the video data from one or more of the data streams as the combined frame of video data in the frame buffer;
    exchanging the data streams between the number of video interfaces, the number of network interfaces, and the frame buffer interface;
    allocating a position of each data stream of the video data in the frame buffer such that the arrangement of the video data of the respective data streams is defined in combined frame; and
    resetting the positions if there is a shift in a position of one of the data streams of video data in the frame buffer.

15. A non-transitory computer-readable medium storing instructions that, when executed by an integrated switching arrangement, cause the integrated switching arrangement to perform the method of claim 14.

* * * * *